(12) United States Patent
Al-Safadi et al.

(10) Patent No.: US 8,804,862 B2
(45) Date of Patent: Aug. 12, 2014

(54) METHOD OF PERFORMING PEAK REDUCTION AND CLIPPING MITIGATION

(75) Inventors: Ebrahim Basil Al-Safadi, Riyadh (SA); Tareo Y. Al-Naffouri, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 340 days.

(21) Appl. No.: 13/346,417

(22) Filed: Jan. 9, 2012

(65) Prior Publication Data

US 2013/0177089 A1 Jul. 11, 2013

(51) Int. Cl.
*H04K 1/10* (2006.01)

(52) U.S. Cl.
USPC ........... 375/260; 375/267; 375/262; 375/316; 375/147

(58) Field of Classification Search
CPC ...................................... H04L 5/0007
USPC ................. 375/260, 316, 220, 296
See application file for complete search history.

(56) References Cited

U.S. PATENT DOCUMENTS

| | | | |
|---|---|---|---|
| 7,003,025 B2 | 2/2006 | Vadde | |
| 7,409,009 B2 | 8/2008 | Akhtman | |
| 7,639,747 B2 | 12/2009 | Moffatt et al. | |
| 7,822,136 B2 | 10/2010 | Moffatt et al. | |
| 2004/0247038 A1* | 12/2004 | Uesugi et al. | ................. 375/260 |
| 2005/0089116 A1 | 4/2005 | Moffatt et al. | |
| 2010/0091900 A1 | 4/2010 | Gan | |
| 2011/0044403 A1 | 2/2011 | Moffatt et al. | |

OTHER PUBLICATIONS

A Fast Posterior Update for Sparse Underdetermined Linear Models Lee C. Potter, Philip Schniter, and Justin Ziniel Department of Electrical and Computer Engineering The Ohio State University, Columbus, OH, 43210-1272 USA.
Ebrahim B. Al-Safadi, Tareq Y. Al-Naffouri, "Peak Reduction and Clipping Mitigation by Compressive Sensing", published online on Jan. 22, 2011; http://aps.arxiv.org/abs/1101.4335.

* cited by examiner

*Primary Examiner* — Lihong Yu
(74) *Attorney, Agent, or Firm* — Richard C. Litman (57) ABSTRACT

The method of performing peak reduction and clipping mitigation provides a compressive sensing algorithm at the receiver of a peak-reducing sparse clipper applied to an OFDM signal at the transmitter. By exploiting the sparsity of the OFDM signal in the time domain relative to a pre-defined clipping threshold, the method depends on partially observing the frequency content of extremely simple sparse clippers to recover the locations, magnitudes, and phases of the clipped coefficients of the peak-reduced signal.

7 Claims, 9 Drawing Sheets

METHOD OF PERFORMING PEAK REDUCTION AND CLIPPING MITIGATION

BACKGROUND OF THE INVENTION

1. Field of the Invention

The present invention relates to digital communications techniques, and particularly to a method of performing peak reduction and clipping mitigation that provides an orthogonal frequency division multiplex (OFDM) Peak-to-Average Power Ratio (PAPR) reduction method for OFDM signals using compressive sensing, and to a transceiver or other apparatus implementing the method.

2. Description of the Related Art

Orthogonal frequency division multiplexing (OFDM) has become a popular technique due to its high spectral efficiency and robustness to fading channels. In OFDM, the total spectrum is divided into narrow parallel sub-bands, each sub-band having a bandwidth that results in minimum delay spread. An OFDM signal is typically constructed by the superposition of a large number of modulated sub-carriers. This superposition results in a signal with high Peak-to-Average Power Ratio (PAPR), which distorts the signal if the transmitter contains nonlinear components, such as high power amplifiers (HPA). The signal also suffers significant spectral spreading and in-band distortion. An intuitive solution to this problem is to back off the operating point of the HPA, which degrades the performance of the HPA, or to use linear amplifiers.

The problem of high Peak-to-Average Power Ratio (PAPR) in OFDM systems has been tackled by a variety of approaches, including coding techniques, constellation reshaping, tone-reservation, and selective mapping, to name a few. For instance, amplitude clipping can be directly applied to reduce the Peak-to-Average Power Ratio (PAPR). However, this clipping results in in-band and out-of-band distortions, which result in Symbol-Error-Rate (SER) degradation and out-of-band radiation, respectively. To counter the effect of out-of-band distortions, a filter can be applied to the clipped signal. However, this might also regenerate new peaks. Hence, amplitude clipping reduces the PAPR at the expense of quantifiable distortion.

In some techniques, symbols are mapped into code words, and extra bit(s) are added to those code words. Following that, only code words that do not result in high PAPR are chosen. This technique requires lookup tables and exhaustive search for the best code word. A simple technique, known as Selected Mapping, reduces the PAPR by generating different sets of data blocks and transmitting the one with the lowest PAPR. This is done by multiplying the initial data set with different phase sequences, and the optimal phase sequence is sent separately to the receiver as side information. A similar technique, known as the Interleaving technique, uses interleaving instead of a set of phase sequences to produce different sequences of the same data, and transmits the one with the minimum PAPR.

Some methods use extra tones to add a peak-reducing signal to the original multicarrier signal to reduce the overall PAPR. This signal can be stripped off at the receiver using the information available at the reserved tones. However, none of the foregoing techniques have proven entirely satisfactory.

Thus, a method of performing peak reduction and clipping mitigation solving the aforementioned problems is desired.

SUMMARY OF THE INVENTION

The method of performing peak reduction and clipping mitigation introduces a tone reservation-based Peak-to-Average Power Ratio (PAPR) reduction scheme that not only reduces the PAPR, but also reduces the complexity of PAPR reduction techniques based on tone reservation. This is achieved by using an extremely simple peak-reducing signal at the transmitter, and then using the reserved tones to detect the positions and amplitudes of clipped peaks by partial observation of their frequency content at the receiver. This approach uses recent advances in reconstruction of sparse signals from rank-deficient projections using convex programming, collectively known as compressive sensing (CS).

Basically, when a clipping signal is applied to cut off the high peaks of an OFDM signal, the subcarriers will be frequency-distorted due to the nonlinear transformation of the random OFDM signal. The present method reserves a subset of the subcarriers (tones), and then uses appropriate techniques of compressive sensing to estimate the peak-reducing signal by observing the frequency distortion on this subset at the receiver. This effectively shifts the complexity to the receiver and drastically reduces it from a function of N (the number of subcarriers in the OFDM signal) to a function of in (the number of reserved tones), which is a small subset of N.

For the sake of CS, the method conditions the additive peak-reducing signal (c) to be sparse in time. This is basically the case if the method sets a clipping threshold on the envelope of the OFDM symbols, or if the transmitter were to clip the highest (s) peaks. Since m is normally fixed, the ability to reduce the PAPR is directly related to increasing s. However, increasing s with m being fixed will result in more PAPR reduction, but with a penalty of increasing Symbol Error Rate (SER) due to imperfect recovery of the additive peak-reducing signal at the receiver. As such, in is an important design parameter. The larger m is, the more clipping the present method can perform and recover at the receiver, and hence the more PAPR the method can reduce.

By far, the most valuable function of compressive sensing algorithms is providing a good estimate of the sparsity pattern of a sparse vector with a limited number of measurements. However, if the positions of the clipped peaks are known beforehand, say by a genie-augmented receiver, then estimating the amplitudes at these positions by least squares is optimum. In the present method, if the cardinality of the peak-reducing signal is known at the receiver at initialization, then the receiver can optimize the estimated peak-reducing signal by using least squares.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The method of performing peak reduction and clipping mitigation has a time-domain complex base-band equivalent channel model given by the relation:

$$y(k) = \sum_{\ell=0}^{L-1} h(\ell)x(k-\ell) + z(k) \quad (1)$$

where $\{x(k)\}$ and $\{y(k)\}$ denote the channel scalar input and output, respectively; $h=(h_0, h_1, \ldots, h_{L-1})$ is the impulse response of the channel; and $z(k) \sim CN(0,\sigma_z^2)$ is AWGN. To compactly notate OFDM, the present method expresses the above channel model (1) in the following matrix form:

$$y = Hx + z \quad (2)$$

where y and x are the time-domain OFDM receive and transmit signal blocks (after cyclic prefix removal) and $z \sim CN(0, \sigma_z^2 I)$.

Due to the presence of the cyclic prefix, H is a circulant matrix describing the cyclic convolution of the channel impulse response with the block x and can be decomposed as $H=F^H DH$, where the superscript H denotes the Hermitian conjugate, F denotes a unitary Discrete Fourier Transform (DFT) with (k,l) element:

$$[F]_{k,\ell} = \frac{1}{\sqrt{N}} e^{-\frac{j2\pi k\ell}{N}}, k, \ell \in 0, 1, \ldots, N-1,$$

$D = \text{diag}(\check{h})$, and $\check{h} = \sqrt{N}Fh$ is the DFT of the channel impulse response.

The time-domain OFDM signal x is typically constructed by taking the IDFT of the data vector $\check{d}$ whose entries are drawn from a QAM constellation. Since this signal is of high PAPR, we add a peak-reducing signal c of arbitrary spectral support at the transmitter, and then estimate it and subtract it from the demodulated signal at the receiver. In what follows, the main condition we impose on c is that it be sparse in time. This is basically the case if we set a clipping threshold on the envelope of the OFDM symbols, or if the transmitter were to clip the highest s peaks. By the uncertainty principle, this necessarily implies that c is then maximally dense in the frequency domain, and thus cannot be used in methods where the data and peak-reducing signal occupy disjoint tones. We will denote by $I_c=\{i:\|c(i)\|\neq 0\}$ the sparse temporal support of c where $I_c = s = \|c(i)\|_0$.

Throughout this application, we will only consider clipping the Nyquist rate samples of the OFDM signal. With this in mind, we assume the entries of x will be uncorrelated, and that the real and imaginary parts of x are asymptotically Gaussian processes for large N. This directly implies that the entries of x are independent, and that the envelope of x can be modeled as a sequence of independent identically distributed (iid) Rayleigh random variables with a common CDF $G_{|x|}(|x|)$.

Denoting $\Omega$ as the set of frequencies in an OFDM signal of cardinality N, let $\Omega_d \subset \Omega$ be the set of frequencies that are used for data transmission and $\Omega_c = \Omega \backslash \Omega_d$ the complementary set reserved for measurement tones of cardinality $|\Omega|=m$. Note that for compressive sensing purposes, a near optimal strategy is to use a random assignment of tones for estimating c. Other researchers have found that by using difference sets, one is able to boost the performance of the recovery algorithm and reduce the symbol error rate.

The data symbols $\check{d}_i$ are drawn from a QAM constellation of size M and are supported by $\Omega_d$ of cardinality $|\Omega|=N-m=k$. Consequently, the transmitted peak-reduced time-domain signal is:

$$\bar{x} = x + c = F^H S_x \check{d} + c \quad (3)$$

where $S_x$ is an N×k selection matrix containing only one element equal to 1 per column, and with in =N−k zero rows. The columns of $S_x$ index the subcarriers that are used for data transmission in the OFDM system. Similarly, we denote by S the N×m matrix with a single element equal to 1 per column that spans the orthogonal complement of the columns of $S_x$. Demodulation amounts to computing the DFT:

$$\begin{aligned}\tilde{y} &= Fy \quad (4)\\ &= F(H\bar{x} + z)\\ &= F\big(F^H DF\big(F^H S_x \check{d} + c\big) + z\big)\\ &= DS_x \check{d} + DFc + \tilde{z}\end{aligned}$$

where $\check{z}=Fz$ has the same distribution of z, since F is unitary. Assuming the channel is known at the receiver, we can now estimate c by projecting $\check{y}$ onto the orthogonal complement of the signal subspace, leaving us with:

$$\begin{aligned}y' &= S^T \tilde{y} \quad (5)\\ &= S^T DFc + z'\\ &= \Psi c + z'\end{aligned}$$

Note that $z'=S^T Fz$ is an m×1 independent identically distributed (i.i.d) Gaussian vector with a covariance matrix $R_z = \sigma_z^2 I_{m \times m}$.

The observation vector y' is a projection of the sparse N-dimensional peak-reducing signal c onto a basis of dimension in m<<N corrupted by z'. Other researchers have demonstrated how such an N-dimensional vector can be estimated from m linear measurements. Note that in our case, the number of measurements m is equivalent to the number of reserved tones, while the number of clipped coefficients is equivalent to s, and hence the amount of clipping should be below certain bounds for reliable recovery given a fixed number of tones m.

Now coming back to our problem, assume the peak reducing signal c is s-sparse in time, given y' in equation (5), we can use any compressive sensing technique at the receiver to estimate c. We will follow the main stream CS literature and use a convex relation of an otherwise NP-hard problem, such as:

$$\min_{\tilde{c} \in C^N} \|y' - \psi\tilde{c}\|_p^p + \lambda\|\tilde{c}\|_1 \qquad (6)$$

for recovery, where p is either 1 (for basis pursuit) or 2 (for least absolute shrinkage and selection operator (LASSO)), and $\lambda$ is a parameter for adjusting the sparsity penalty. The resulting solution by compressive sensing alone is an estimate $\hat{c}_{cs}$ of the peak reducing signal, which not only reliably detects the positions of its nonzero entries, but also gives a good approximation to the corresponding amplitudes. Notice, however, that the estimation of c is by no means restricted to convex relaxations, such as in equation (6), and any compressive sensing method is valid in general, thus opening the door for many possible improvements in regard to complexity and efficiency.

Figure 1A:
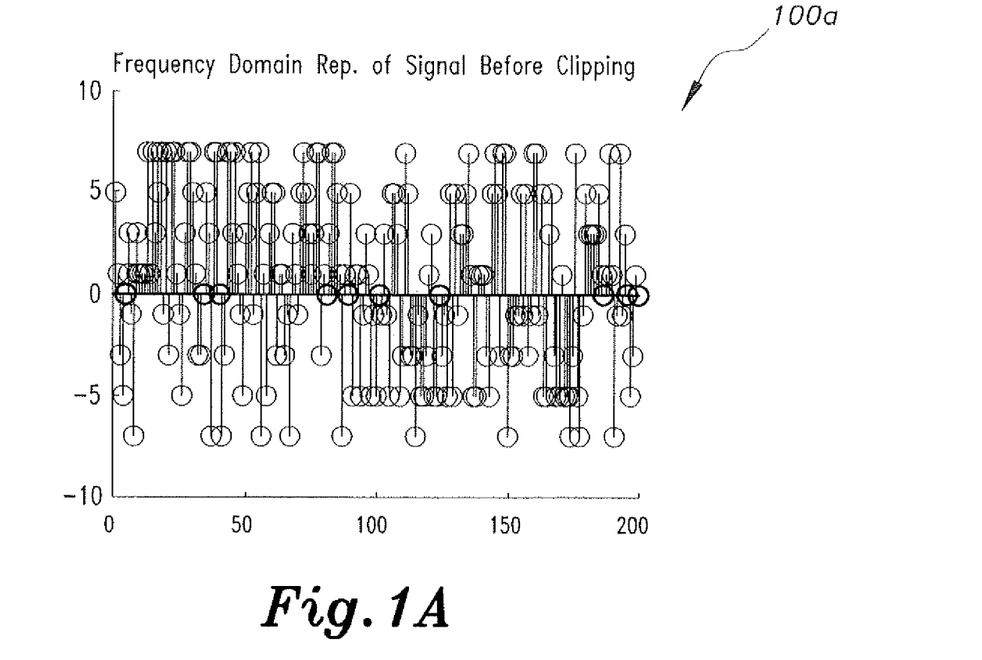
FIG. 1A is a frequency domain plot of an exemplary OFDM signal before clipping.
Figure 1B:
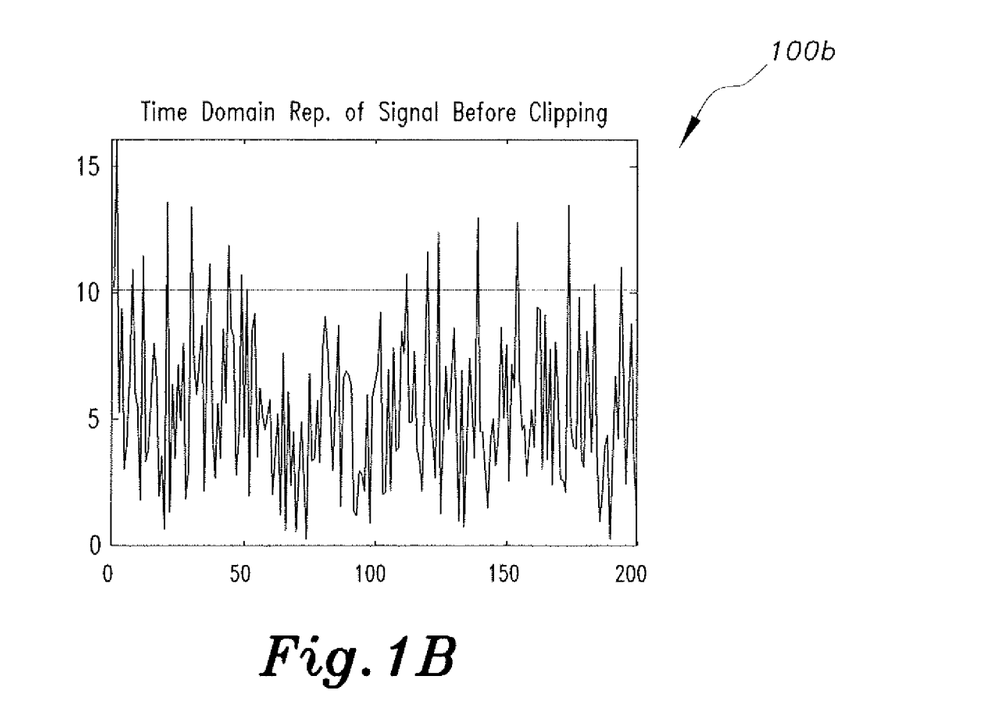
FIG. 1B is a time domain plot of the signal of FIG. 1A before clipping.
Figure 1C:
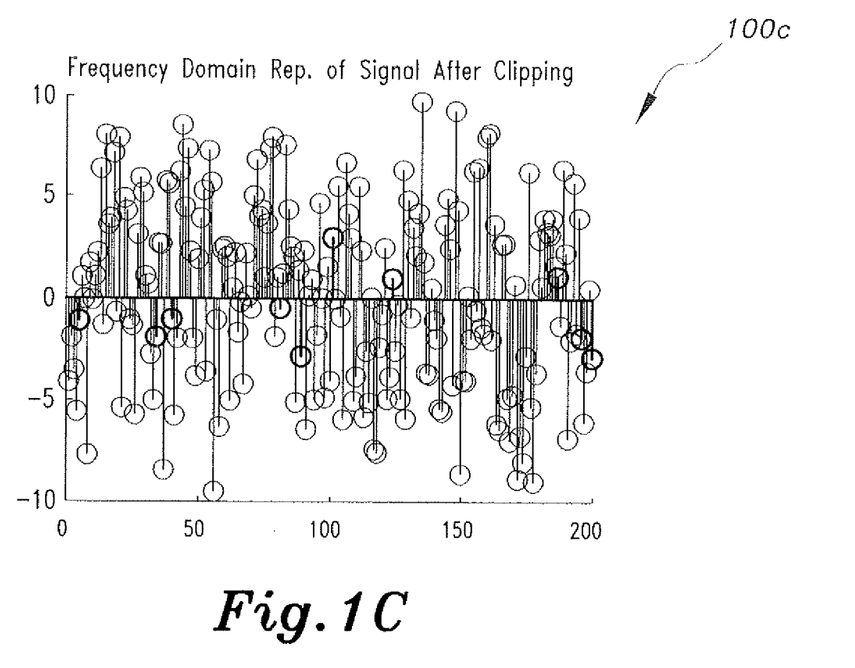
FIG. 1C is a frequency domain plot of the signal in FIG. 1A after clipping.
Figure 1D:
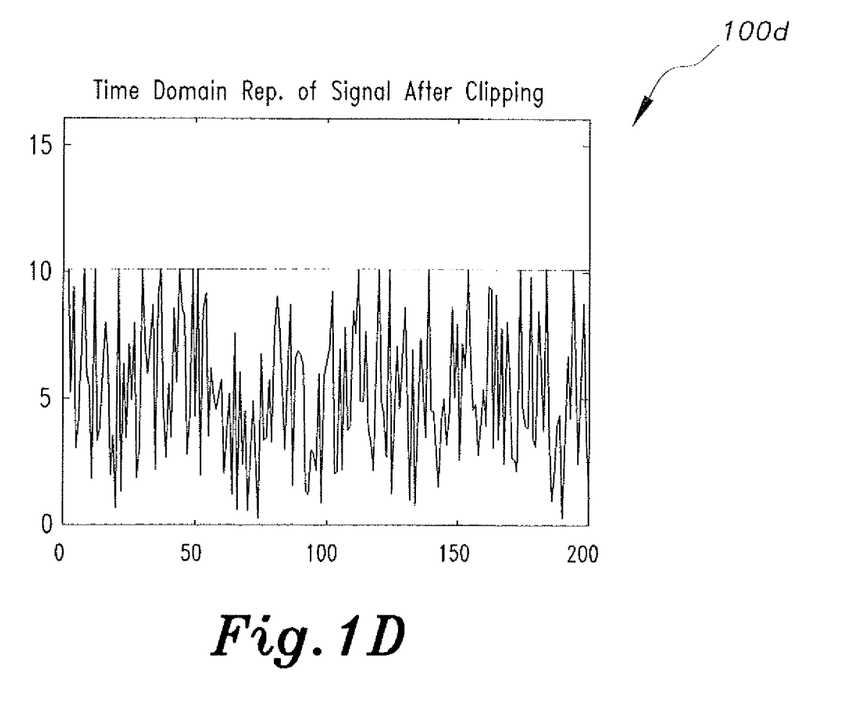
FIG. 1D is a time domain plot of signal of FIG. 1A after clipping.

FIGS. 1A-1D, which show plots 100a, 100b, 100c, and 100d, illustrate the main points with respect to the clipping problem, although caution must be taken, as the actual OFDM signal is generally complex. Describing the sequence of operations at the transmitter, we note the following. (1) The frequency domain representation $\check{x}$ of x, where each coefficient $\{\check{x}(i)\}_{i \in \Omega_d}$ in $\check{d}$ is drawn from an M-QAM constellation, is shown in plot 100a of FIG. 1A. The reserved tones are now null. (2) Plot 100b of FIG. 1B shows the corresponding time domain representation of the OFDM signal, IDFT ($\check{x}$), which is of high PAPR, (3) Plot 100c of FIG. 1C shows the simple operation of clipping the peaks in x and suppressing them to a threshold y, leaving us with $\bar{x}$ of lower PAPR to transmit with the clipping signal c, being the difference between x and $\bar{x}$. (4) Plot 100d of FIG. 1D shows the effect of clipping in the frequency domain. The distortion has spread over all subcarriers, including the reserved tones, which are no longer null. This entire distortion is actually the frequency content of the clipping signal c, which we can only partially observe from the reserved tones $\Omega_c$. We wish to reconstruct c from the reserved tones at the receiver.

Figure 2:
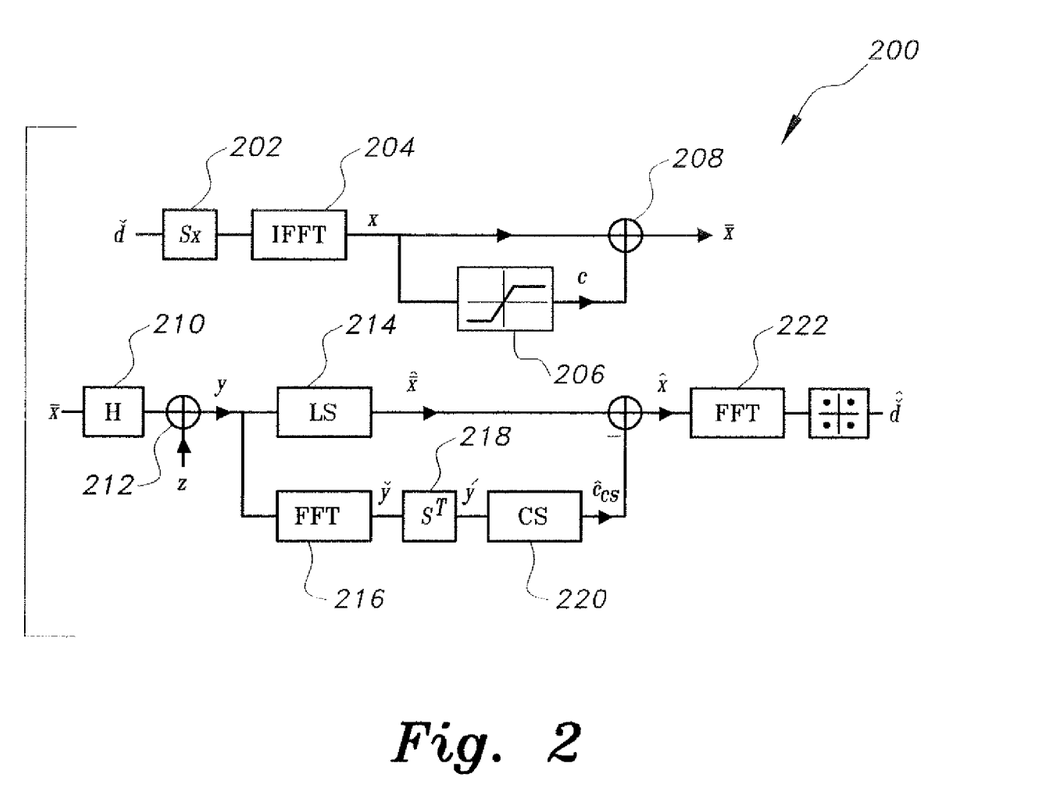
FIG. 2 is a block diagram of a basic OFDM system capable of carrying out the method of performing peak reduction and clipping mitigation according to the present invention the top portion representing a transmitter circuit and the bottom portion representing a receiver circuit.
Figure 3:
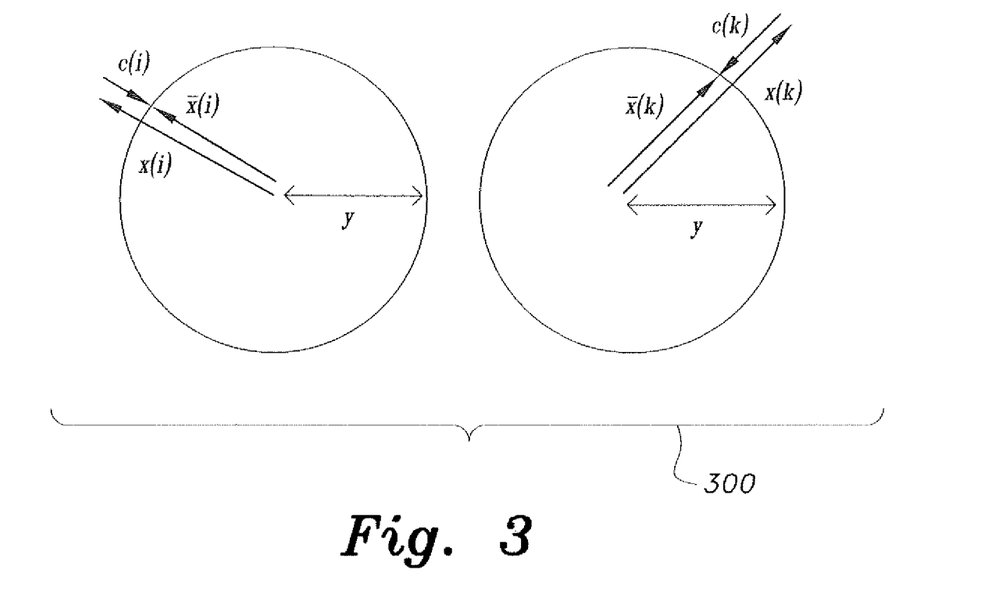
FIG. 3 is a peak suppression plot illustrated on the complex plane.
Figure 4:
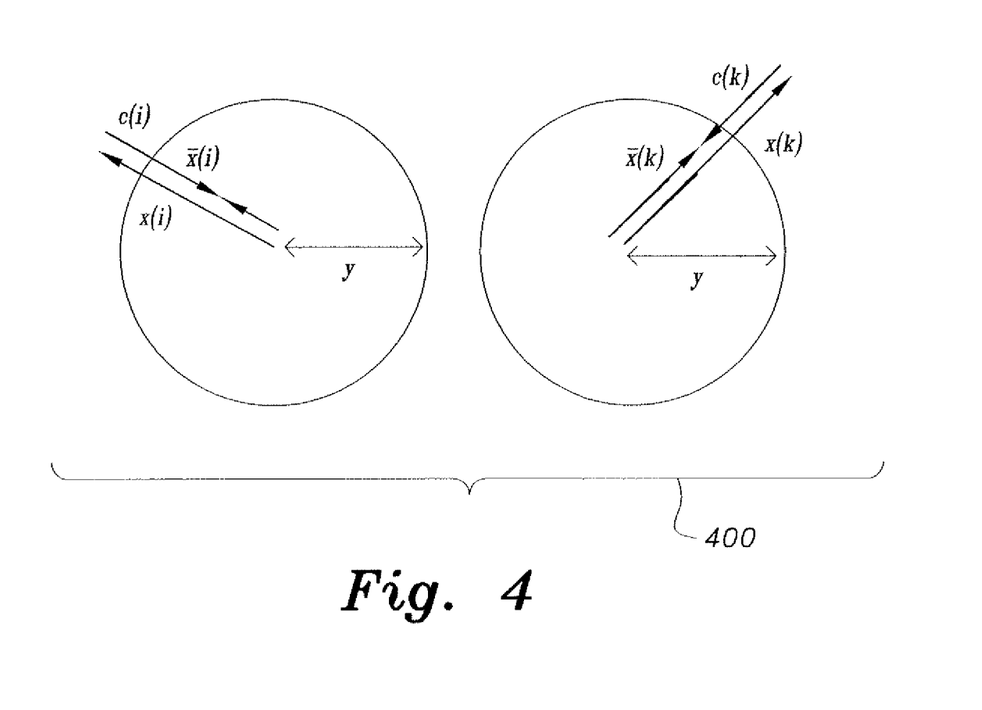
FIG. 4 is a peak suppression plot showing clipping with fixed magnitude.

As shown in FIG. 2, PAPR reduction is achieved at the transmitter 200 by using tone reservation and compressive sensing. The time domain OFDM signal x at block 202 is constructed by inputting the data vector $\check{d}$, whose entries are drawn from a QAM constellation, to an IFFT block 204. The x signal, which is typically of very high PAPR, is split into a feedthrough portion and a clipper input portion. The clipper input portion is input to a clipping block 206. Clipping block 206 operates in the time domain and produces a peak-reducing signal c of an arbitrary spectral support at the transmitter 200. The peak-reducing signal c and the feedthrough signal x are added together in summation block 208 to produce a reduced PAPR output signal $\bar{x}$.

The receiver utilizes properties of the spectrum of the reserved tones to estimate the reducing signal c, and then subtracts the estimated reducing signal from the demodulated signal. The receiver has an H block 210 feeding block 212, which sums the received reduced PAPR OFDM signal $\bar{x}$. The received signal is summed with a z signal in summation block 212. The resultant is fed into an FFT block 216 and a feedthrough, least squares estimation (LS) block 214. Utilizing compressive sensing, estimation of c is performed in blocks 218, and 220, whereby c is conditioned to be sparse in time and then added to the least squares modified $\bar{x}$ signal to provide the clipped OFDM signal $\hat{x}$, which is transformed at FFT block 222 to recover the symbol stream $\hat{d}$.

The block diagram in FIG. 2 stresses that upon observing y, the receiver is confronted with two estimation problems. The first is the typical estimation of the transmitted (clipped) OFDM signal $\bar{x}$, and the second is the estimation of the peak reducing signal c. Although the noise statistics are the same in both cases, the estimation SNR is nevertheless very different, depending on the clipping procedure. The SNR notation is reserved for the received signal-to-noise-ratio, and the clipper-to-noise-ratio is denoted by CNR, and is defined as:

$$CNR = \frac{E[\|\psi c\|^2]}{E[\|z'\|^2]} \qquad (7)$$

$$= \frac{E[\|\sum_{k \in I_c} c(k)\psi_k\|^2]}{\sigma_z^2}$$

and hence depends on the sparsity level $\|c\|_0 = |I_c|$ and the magnitudes of $\{c(k)\}_{k \in I_c}$, which are both functions of the clipping threshold $\gamma$. This is the parameter of concern when it comes to compressive sensing in the present method. By definition, the CNR is typically less than the SNR, since the energy of c leaks onto all the subcarriers, even though the CS algorithm only has access to $$\frac{m}{N}$$

of them, and also since the magnitudes of the nonzero coefficients of c are practically smaller than those of x.

Notice that in using CS, the objective is to find the support $I_c$ of the sparse signal and its complex coefficients $\{v(k)\}_{k \in I_c}$ at those locations. It is possible to decompose the two problems into $c = S_c v_c$ and use CS for the first problem only, yielding $\hat{S}_c^{(cs)}$ based on $I_c^{(cs)}$, and then refine the coefficient estimate by a more robust technique, such as least squares after conditioning on the detected support. To do so, we define the m×s matrix $\hat{\phi} = \psi \hat{S}_c^{(cs)}$ and refine the amplitude estimate to:

$$\hat{v}_c^{Is|cs} = (\hat{\phi}^H\hat{\phi})^{-1}\hat{\phi}^H y', \qquad (8)$$

in which case $\hat{c}^{cs|Is} = \hat{S}_c^{cs|Is}\hat{v}_c^{Is|cs}$ follows. This dual approach is necessary in order to approach an oracle receiver that uses least squares.

The common function of reserved tones, as is known in the literature, is to act as a frequency support for the peak reducing signal that is disjoint from the data-carrying tones. In other words, for each OFDM signal a search is conducted for some signal c that will reduce the PAPR while being spectrally confined to a limited number of tones. Although many different methods exist to find such a signal, we only mention a well-known related art method that requires solving the convex optimization problem $$\min_{\tilde{c}} t \qquad (9)$$

-continued $$\text{s.t.} \|x + F^H S\check{c}\|^2 \geq t$$

where $\check{c}=F_c$ is nonzero only on $\Omega_c$ from the definition of S. Clearly, this optimization approach should result in significantly more PAPR reduction compared to our design, since for the same number of reserved tones m, we can only clip s<m maximum peaks, whereas by the related art method, no such restriction exists.

Most importantly however, the main complexity (i.e., the stage at which the optimization search is performed) in the aforementioned related art technique is at the transmitter. As for the present method's technique, the peak reducing signal is automatically constructed from clipping the maximum peaks, leaving the problem of estimating the clipping locations and amplitudes to the receiver. This, hence, completely shifts the complexity to the receiver's side and could only be achieved recently by a compressive sensing strategy.

It is worth mentioning that the related art also suggests a suboptimal system that avoids repetitive optimization by designing peak reducing kernels. These are used for directly clipping the peaks that exceed a threshold (similar to our basic threshold-based clipper), but are designed at initialization to have a confined spectral support based on the provided peak reducing tones. The problem is that due to this confined spectral support, these kernels have temporal side lobes that cause variable peak regrowth among the OFDM signals, and the related art attempts to optimize the location of the peak reducing tones to minimize these side lobes. Clearly, the present method's approach sidesteps this annoying problem, since we need not confine the spectral support of c.

So far, we were only interested in using compressive sensing in its most abstract form as it applies to our problem. The foregoing discussion has assumed, following the general literature on CS, that absolutely no information is known about the locations, magnitudes, and phases of the sparse signal c beyond the incomplete frequency observations that were obtained from the reserved tones $\Omega_c$. In other words, the model y'=ψc+z' was assumed to exist independently of the general transceiver model y=H$\bar{x}$+z, even though in reality we know that c is intimately linked to $\bar{x}$ by the simple fact that it's superimposed on x in the time domain.

The method of performing peak reduction and clipping mitigation demonstrates that for optimal PAPR Reduction using CS, the estimation of the clipping signal at the receiver should exploit as much information as possible in both basis representations, which can be achieved by weighting, constraining, or rotating the frequency-based search based on information we infer from the data in the time domain. The difficulty of these problems is strongly related to the way clipping is performed. Although we have full control in selecting the sparsity level and the clipping magnitudes and phases to best suit our purpose, there can't be a clipping technique that optimizes both the support recovery and coefficient estimation, so that a compromise must be made regarding the quality of the two.

We first define two simple clipping techniques that do not require any optimization or spectral confinement, and although we derive their PDFs along other properties, we focus exclusively on deterministic CS enhancement techniques, and subsequently discuss the matter of Bayesian compressive estimation or sensing.

Because clipping is done on the coefficients of x whose envelope exceed γ, the most natural construction of the clipping signal c would be to basically suppress the magnitudes of the entries to $x_i$:$|x_i|\geq\gamma$ to γ while preserving their angles, such that $|x_i+c_i|=\gamma$ (see FIG. 3, 300 and FIG. 4, 400). This is commonly expressed in the literature as:

$$\bar{x}(i) = \begin{cases} \gamma e^{j\theta_{x(i)}} & \text{if } |x(i)| > \gamma \\ x(i) & \text{otherwise} \end{cases} \quad (10)$$

The PDF of the nonzero coefficients of $c^{ps}$ will depend on the PDF of $|x|||x|>\gamma$, with their magnitudes being merely shifted and re-scaled as a function of γ. Hence, if we define the binary set Q to label the mutually exclusive events of clipping or not at a certain index i then:

$$f(|c^{ps}|(i)) = \sum_{q \in Q} P(|c^{ps}(i)| \mid q) P(q) \quad (11)$$

$$= f_{|X|||X|>\gamma}(|c^{ps}|(i) + \gamma)(1 - G_{|X|}(\gamma)) + \delta(|c^{ps}(i)|)G_{|X|}(\gamma)$$

$$= \alpha^{-1}(\gamma)(1 - G_{|X|}(\gamma))f_{|X|}(|c^{ps}(i)| + \gamma) \cdot u(|c^{ps}(i)|) +$$

$$G_{|X|}(\gamma)\delta(|c^{ps}(i)|)$$

where u(·) is the unit step function and $\alpha(\gamma)=\int_\gamma^\infty f_{|x|}(|x|)dx$ is a normalizing constant that depends only on γ and is required to ensure that $\int_0^\infty f_{|x|||x|>\gamma}(|x|||x|>\gamma)d|x|x=1$. Not surprisingly, this is the most popular soft clipping scheme due to its simplicity and relatively low spectral distortion.

Two features of this clipping scheme stand out in regard to CS enhancement. The first is that by suppressing all the data coefficients to a fixed and known threshold value y, one can actually infer some additional information regarding possible clipping locations from the distance between the estimated coefficients' magnitudes and γ. This clipping scheme can hence provide additional information regarding the support $I_c$.

The second feature is that the nonzero coefficients of $c^{ps}$ are exactly anti-phased with the data coefficients at $I_c$, yielding another source of information regarding the phases $\theta_{c^{ps}(I_c)}$ based on $\bar{x}$. Such signals are called homogeneous clippers, since their phases are aligned with the data.

In terms of delectability from standard compressive sensing, however, the method is quite unsatisfying if left unenhanced, demanding a higher number of measurements for the same sparsity level and SER compared to other clipping techniques. The main reasons are detailed as follows.

First, the CNR in PS becomes low, i.e., decreases very rapidly with γ. Assuming we neglect the effect of Ψ:

$$E[\|c^{ps}\|^2] = \sum_{k \in I_c} E[|c^{ps}(k)|^2] \quad (12)$$

$$= E[|c^{ps}(k)|^2] \cdot E[\|c\|_0]$$

$$= \int_{-\infty}^\infty |c^{ps}(k)|^2 f(|c^{ps}(k)|) d|c^{ps}(k)| \cdot E[\|c\|_0]$$

$$= \left[\alpha^{-1}(\gamma)(2\sigma_{|x|}^2 + \gamma^2)e^{\frac{\gamma^2}{2\sigma_{|x|}^2}} - \gamma\right] \cdot E[\|c\|_0]$$

where the average sparsity:

$$E[\|c\|_0] = N^2(1-G_{|x|}(\gamma))^2 - N(1-G_{|x|}(\gamma))^2 + N(1-G_{|x|}(\gamma))$$

is simply the expectation of the Binomial corresponding to the sparsity level. Notice the cumulative effect of γ on $E[\|c^{ps}\|^2]$.

Second, $|c_{min}^{ps}|$ vanishes because the random magnitudes of $c^{ps}$ are drawn from the tail distributions of the data coefficients, making the limiting distance between the minimum penetrating coefficient and $\gamma$ approach zero. This is a critical bottleneck in CS that cannot be completely compensated for by increasing the CNR.

With respect to Digital-Magnitude Clipping, in order to avoid the problems of the previous clipping technique, we could increment the magnitudes of $c^{ps}$ by some constant until we're satisfied with the CNR and $|c_{min}^{ps}|$. This, however, still leaves us with the burden of estimating the random magnitudes, while destroying the enhanced support detection property of peak suppression.

Instead, we consider inverting the procedure from suppressing to a fixed value $\gamma$, into suppressing by a fixed value $\zeta$. It is known that, with no modification or realization to this additional structure, a compressive estimation algorithm works best when all the nonzero coefficients in c are equal in magnitude.

Now that $\{|c(k)|\}_{k\in I_c}$, we've decreased the degrees of freedom of c to $I_c$ and $\theta_c$ only. Furthermore, such a clipping scheme preserves the anti-phase property as well, thus possibly reducing the problem to that of support detection. In the case of digital clipping with phase augmentation, the problem can also be recast as that of detecting a point on a sparse lattice, and a regularized sphere decoding algorithm could be used.

More generally, we could suppress the high peaks of x by a finite set of magnitudes $\{\zeta_0, \zeta_1, \ldots, \zeta_l\} \in \mathbb{Z}^l$ (hence the attribute of Digital Magnitude Clipping (DMC)), although we will only focus here on the binary magnitude space $|c| \in \{0, \zeta\}$.

Following the same procedure in equation (11), and by noting the interesting relation $\|c\|_p = \zeta \|c\|_0^{1/p}$, $p=1, 2, \ldots$, the PDF of the clipping signal's envelope is basically:

$$f(c^{dm}(i)) = (1 - G_{|x|}(\gamma))\delta(|c| - \zeta) + G_{|x|}(\gamma)\delta(|c|) \qquad (13)$$

The PDF of a coefficient's magnitude has been reduced to a Bernoulli random variable with probability of success equal to $(1 - G_{|x|}(\gamma))$. More generally, the PDF of the complex coefficient is now an impulse at the origin of the complex plane scaled by $G_{|x|}(\gamma)$, surrounded by a ring of radius $\zeta$ and height $(1 - G_{|x|}(\gamma))/2\pi$ above the plane (corresponding to the random phase). Furthermore, the two clipping methods achieve the same CNR when:

$$\zeta = \sqrt{\alpha^{-1}(\gamma)(2\sigma_{|x|}^2 + \gamma^2)e^{\gamma^2/2\sigma_{|x|}^2} - \gamma}. \qquad (14)$$

There is a conflicting interest in deciding the value of $\zeta$. On the one hand, the more we increase it, the higher the CNR and the easier the support detection becomes, but on the other hand, the overall error of the system dramatically increases in case of faulty support detection. Furthermore, the oversampling at the subsequent stage of transmission becomes more complex in the latter case.

Nevertheless, we should at least set a lower bound on its value to ensure that all clipped coefficients will always end up with magnitudes equivalent to or below the desired clipping threshold $\gamma$, depending on the envelope's maximum order statistic. Afterwards, we should be very conservative in increasing $\zeta$.

If by some prior information we have a better picture regarding the support $I_c$ beyond the Bernoulli process assumption, we can modify the LASSO in Equation (6) by penalizing disfavored locations so that:

$$\hat{c} = \arg \min \|y' - \psi c\|_2^2 + \lambda \|w^T c\|_1, \qquad (15)$$

where w is a weighting vector imposed on the $l_1$ penalty term based on this prior information. In the literature, the source of w is from previous runs of the CS algorithm itself, where the hope is that with each iteration more confidence will exist in $\hat{I}_c^{(k+1)}$ based on:

$$w(i)^{(k+1)} \propto [|\hat{c}(i)^{(k)ps}| + \epsilon]^{-1} \quad i=1,2,\ldots,N \qquad (16)$$

for instance, where $\epsilon > 0$ is a small stabilizing parameter. We will refer to this procedure as internally weighted $l_1$ minimization.

Repeating the CS algorithm is computationally expensive, and the process is sensitive to the quality of the first unguided CS estimate. Instead, we would rather use a one-shot weighting scheme that minimally increases the complexity of an ordinary least absolute shrinkage and selection operator (LASSO). Fortunately, this could be done if we had an external source of information based on the data vector $\bar{x}$. With further respect to embedded information on the support $I_c$ in peak suppression, the idea is that we expect the coefficients of $\bar{x}$ whose magnitudes are close to $\gamma$ to be more probable clipping locations compared to ones that are not. Consequently, we can define a weighting vector $w^{ps}$ based on $\bar{x}$ for inducing a clipping location:

$$w^{ps}(i) = |\bar{x}(i) - \gamma|, i=1,2,\ldots,N \qquad (17)$$

and use it in equation (15).

Notice also that what helps in suppressing only to $\gamma$ here is that we have a probabilistic means to cast out most of the possible false positives. Had we suppressed the magnitudes to the envelope mean, for instance $E[|x(i)|]$, the procedure above would favor many locations as clipping positions by the fact that $|\bar{x}| - E[|x(i)|]$ is small. Nonetheless, misleading bias to certain locations as candidates for clipping positions due to their coefficient's natural proximity to $\gamma$ can never be completely eliminated, even at infinite CNR.

In the case of homogenous clipping, $\theta_c(I_c) = \theta_{\bar{x}}$ at the transmitter, and consequently the CS algorithm should have access to additional information regarding the phases of the nonzero coefficients. The problem, however, is that we only have an estimate $\theta_{\bar{x}}(I_c)$ at the receiver, and the extent to which CS can benefit from this property depends on how good the estimate $\bar{x}$ is in general. To this end, we will only consider the SNR as the parameter to which we judge the quality of the data estimate.

Regarding the CNR and SNR, the effect of gradually increasing $\zeta$ is considered. When $\zeta=0$, the $\gamma$-penetrating coefficient attains its maximum SNR, then as we increase $\zeta$, the CNR increases as $\zeta^2 E[\|c\|_0]$ while the SNR decreases by $\zeta(2E[|x|] - \zeta)$. Consequently, the CNR will be larger than the SNR in the locations where $(E[|c|_0] - 1)\zeta^2 + 2E[|x|]\zeta - E[|x|^2]$. Fortunately, practical values of $\zeta$ relative to $E[|x|]$ fall outside this region, and we would normally expect to gain information regarding $\theta_c$ from $\bar{x}$ that is more reliable than information from CS alone.

This fact encourages us to absorb, and perhaps even replace altogether, as much information as possible regarding $\theta_c$ from the estimated data vector $\bar{x}$. Assume first that we know the vector $\theta_c$, we could then merge this information into the CS algorithm by expressing the clipping signal as $c = \Theta_c |c|$ such that:

$$c = \begin{bmatrix} e^{j\theta_c(1)} & 0 & 0 & 0 \\ 0 & e^{j\theta_c(2)} & 0 & 0 \\ 0 & 0 & \ddots & 0 \\ 0 & 0 & 0 & e^{j\theta_c(N)} \end{bmatrix} \cdot \begin{bmatrix} |c(1)| \\ |c(2)| \\ \vdots \\ |c(N)| \end{bmatrix},$$

which could be directly fused into the measurement matrix $\psi$, thus transforming our model from $y'=\psi c+z'$ to $y'=\psi \Theta_c|c|+z'$ where the relation:

$$\psi \Theta c = \begin{bmatrix} | & | & & | \\ e^{j\theta_c(1)}\psi_1 & e^{j\theta_c(2)}\psi_2 & \cdots & e^{j\theta_c(N)}\psi_N \\ | & | & & | \end{bmatrix}$$

has now realigned the phases of the coefficients sought and reduced the problem to estimating a real sparse vector, with only the locations and magnitudes of the nonzero coefficients of c to be found. In the case of digital clipping, we can then force the magnitudes to the nearest alphabets as well. In any case, with $\Theta_c$ unknown prior to CS, we will instead use $\hat{\Theta}_{\bar{x}}$ to augment the CS algorithm. This could be done in two ways.

First, this could be done by a sense then Rotate (StR) technique, wherein the standard CS or a weighted CS algorithm is used to regain $\hat{c}^{NoPA}=\arg_{c \in \mathbb{C}^N} \min \{\|y'-\psi c\|_2^2+\lambda\|c\|_1\}$ where PA stands for Phase Augmentation, extract the locations and magnitudes of the nonzero coefficients from a $\hat{c}$, and then rotate them according to the corresponding estimated directions in $\bar{x}$ according to the relation:

$$\{\hat{c}^{StR}(i)\}_{i \in I_c} = \{|\hat{c}^{NoPA}(i)|e^{j\Theta_{\bar{x}(i)}}\}_{i \in I_c} \qquad (18)$$

Alternatively, the CS algorithm augmentation could be done by a Rotate then Sense (RtS) operation in which the CS algorithm is supplied with the phase information from $\bar{x}$ as described above, and a solution is provided for the relation:

$$\hat{c}^{RtS}=\arg_{|c| \in \mathbb{R}^N} \min \{\|y'-\Psi\hat{\Theta}_{\bar{x}}|c|\|_2^2+\lambda\||c|\|_1\} \qquad (19)$$

Notice that, similar to equation (18), one could also replace the phases of $\hat{c}^{RtS}$ with $\{e^{j\Theta_{\bar{x}(i)}}\}_{i \in I_c}$ after equation (19), but we have not observed any significant improvement in doing so.

Instead of deterministic CS enhancement techniques, the clipping signal may be estimated by Bayesian Estimation of Sparse Clipping Signals. To take into account the statistical information at hand, we could simply modify the dual-stage estimate in equation (8) to a linear minimum mean-square error (LMMSE) estimate of the amplitudes $v_c$ conditioned on the support estimate $\hat{I}_c^{CS}$:

$$\hat{v}_c^{LMMSE|I_c^{CS}}=\sigma_{v_c}^2 \hat{\Phi}^H (\sigma_{v_c}^2 \hat{\Phi}\hat{\Phi}^H+\sigma_z^2 I_m)^{-1}(y'-\hat{\Phi}E_{v_c}).$$

This should clearly improve upon the least square estimate of equation (8) in case the distribution of $v_c$ is Gaussian, but will not be able to invoke any statistical information into the support estimate. Using a maximum a posteriori (MAP) estimate, $\hat{c}=\arg \max P(y'|c)P(c)$, generally leads to non-convex optimization problems in sparse models, and we refer instead to an MMSE estimate. First define $J^I$ as the Hamming vector of length N and Hamming weight $|I|$ with active coefficients according to the support set I. Then, marginalizing on all such possible vectors, we obtain:

$$\hat{c}^{MMSE} = E[c|y'] \qquad (20)$$

$$= \sum_{i=1}^{2^N} E[c|y', J_i]P(J_i|y')$$

$$= \sum_{i=1}^{2^N} E[c|y', J_i]P(y'|J_i)P(J_i)$$

with dropping off $P(y')$ in equation (20) due to its independence of i. The estimate is a weighted sum of conditional expectations, and the formal (exact) approach requires computing $2^N$ terms, which is a formidable task for large N. To limit the search space, it is preferable to truncate the summation index to a much smaller subset of support vectors J*. As such, the weights $\{P(J_k|y')\}_{k \in J^*}$ will not sum up to unity, and we will need to mitigate this by normalizing the truncated weighted sum by the sum of weights $W=\Sigma_{k \in J^*}P(y'|J_k)P(J_k)$, hence reducing equation (20) to:

$$\hat{c}^{MMSE} \approx \frac{1}{W} \sum_{k \in J^*} E[c|y', J_k]P(y'|J_k)P(J_k). \qquad (21)$$

In effect, estimating c in an MMSE criterion boils down to appropriately selecting J* and evaluating the terms $P(J_k)$, $P(y'|J_k)$ and $E[c|y', J_k]$, $\forall J_k \in J^*$, which are in increasing complexity in the order we've just mentioned.

Figure 5:
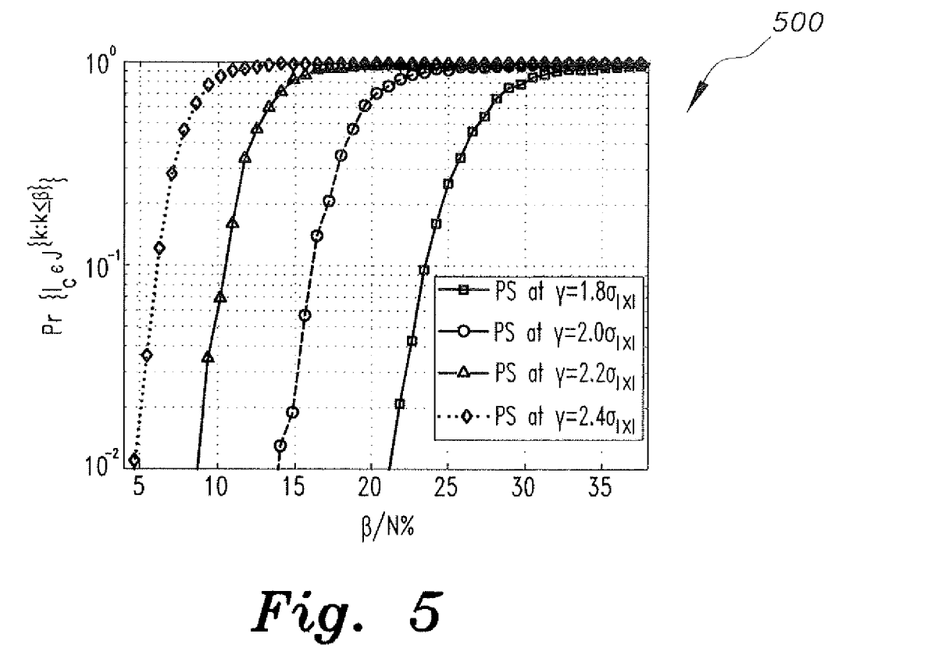
FIG. 5 is a plot showing probability of support index.

When using peak suppression to $\gamma$, the receiver is given a vague picture of where clipping has occurred based on the affinity of $\bar{x}$ to $\gamma$. Consequently, by sorting the magnitudes of the weighting vector $w^\downarrow$ in equation (17) in ascending order, the probability of the true support coinciding with the first $\beta$ elements in $\arg\{w^\downarrow\}$ will increase rapidly with $\beta$. Plot 500 in FIG. 5 shows a Monte Carlo simulation of this probability at different clipping thresholds. For instance, this implies that given a clipping threshold of $\gamma=2\sigma_{|x|}$, one could exclude 70% of the N indices as having too low a probability of corresponding to a clipping location, thus reducing the possible candidates from $2^N$ to $2^\beta$ Hamming vectors.

Given this reduced set $J^{\{k:k \leq \beta\}}$ of vectors, we adopt a search over it by latching a vector of unity Hamming weight based on equation (21), and then proceed in a greedy fashion until a maximum sparsity level $s^{max}$ is reached. This will preserve the quality of the greedy estimate using Fast Bayesian Matching Pursuit (FBMP), while reducing the number of executions of equation (21) by:

$$100\left(1 - \frac{\beta(1+\rho \cdot s^{max}) - \frac{\rho \cdot s^{max}(s^{max}+1)}{2}}{N(1+\rho \cdot s^{max}) - \frac{\rho \cdot s^{max}(s^{max}+1)}{2}}\right)\%$$

where $\rho$ is the number of tested candidates for each Hamming weight. This would correspond to a reduction of 60-80% of executions with our practical parameters, and we will henceforth refer to this procedure as $\beta$-FBMP.

For our simulation purposes, we considered an OFDM signal of N=256 subcarriers, of which m=0.2N are measurement tones. The data coefficients were generated from a QAM constellation of size M=32. The Rayleigh fading channel model was of 32 taps, operating at a 30 dB SNR environment. The performance parameters we considered were the SER, the relative temporal complexity, the PAPR reduction ability, and the capacity.

Our primary objective was to test the SER variation with the clipping threshold $\gamma$ for a clipped OFDM signal that used our different adaptations of CS algorithms and clipping techniques. Observed as a variable, the clipping threshold in particular is of central importance due to its critical effect on both CS generic performance and the PAPR reduction. Decreasing $\gamma$ significantly reduces the PAPR, but also implies a nonlinear increase in the average sparsity level that the estimation algorithms must tolerate. It also has a positive counter-effect on CS performance as well, since it increases the CNR, making the overall behavior of SER($\gamma$) difficult to predict.

Furthermore, when testing the precise performance of an algorithm, we used the Normalized Mean Square Error $$NMSE = E\left[\frac{(c - \hat{c})^2}{\|c\|_2^2}\right]$$

to ensure that error decrease was not simply due to a decrease in the number of estimated variables.

Figure 6:
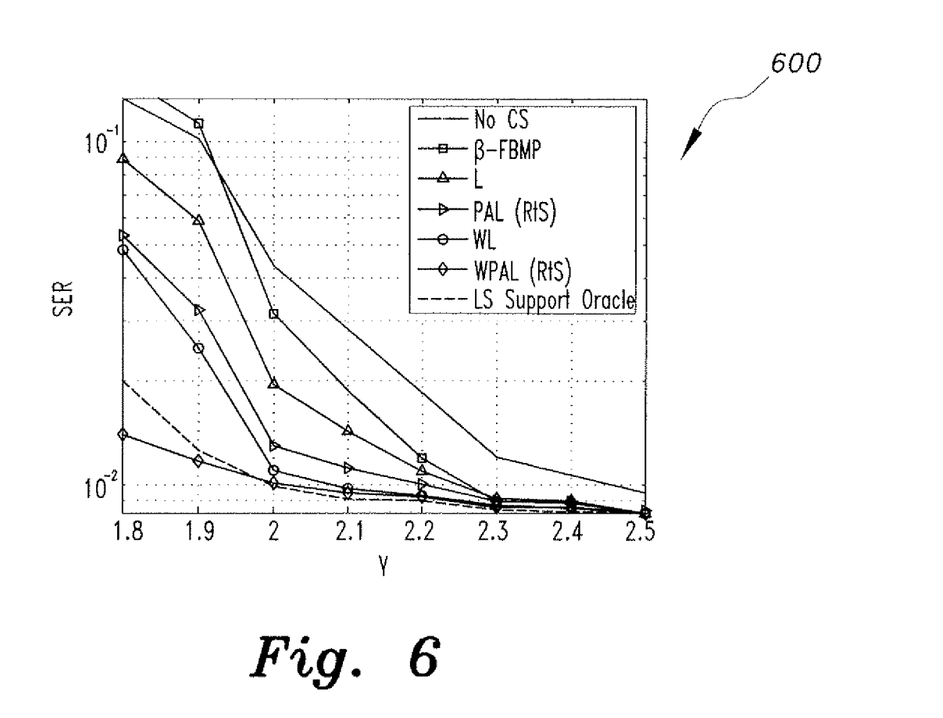
FIG. 6 is a plot SER of PS vs gamma.

Plot 600 in FIG. 6 shows the SER for Peak Suppressing clippers in homogenous clipping techniques that employ peak suppression to $\gamma$ after QAM decoding $(FS_x)^\dagger(\bar{x}^{Is}+\hat{c}^{(ps)})$ as the clipping threshold is varied. The methods tested were the reduced search space greedy method ($\beta$-FBMP), the LASSO, the Phase-Augmented LASSO (PAL) using equation (19), the data-based Weighted LASSO (WL), and the Weighted Phase-Augmented LASSO (WPAL). These were compared against two performance bounds: the lower bound of not estimating c, and the upper bound of an oracle receiver that knows the support $I_c$, and simply uses least squares to estimate the coefficients' amplitudes. Interestingly, combining the support and phase augmentation techniques into the LASSO enables it to perform very close to the support oracle, and even beat it at low clipping thresholds where s>0.55 m, since it has additional information regarding the coefficients' phases. Furthermore, weighting alone is more effective then phase-augmentation, although both significantly improve the performance of the LASSO.

Figure 7:
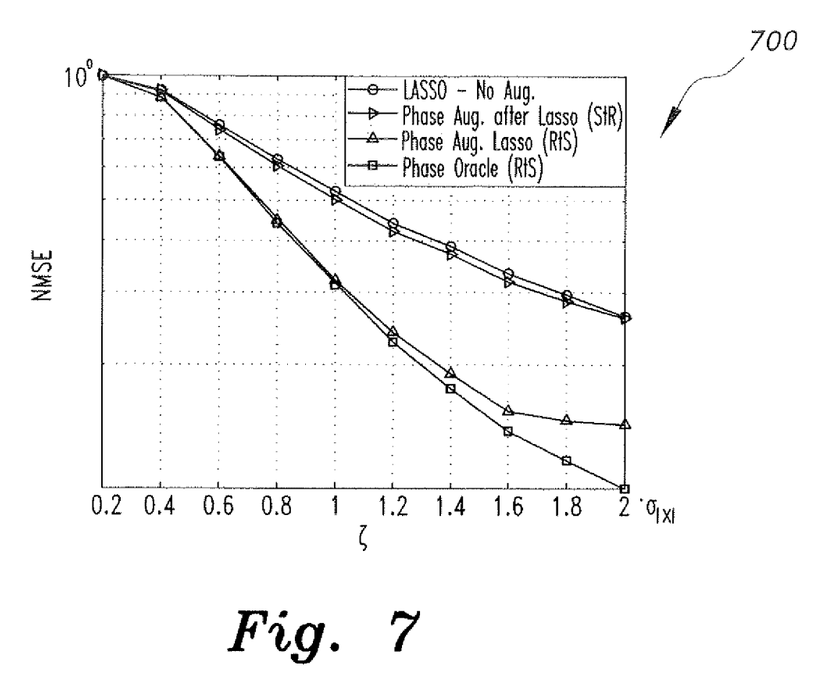
FIG. 7 is a plot of NMSE, showing digital clipper estimate as a function of the coefficient magnitude.
Figure 8:
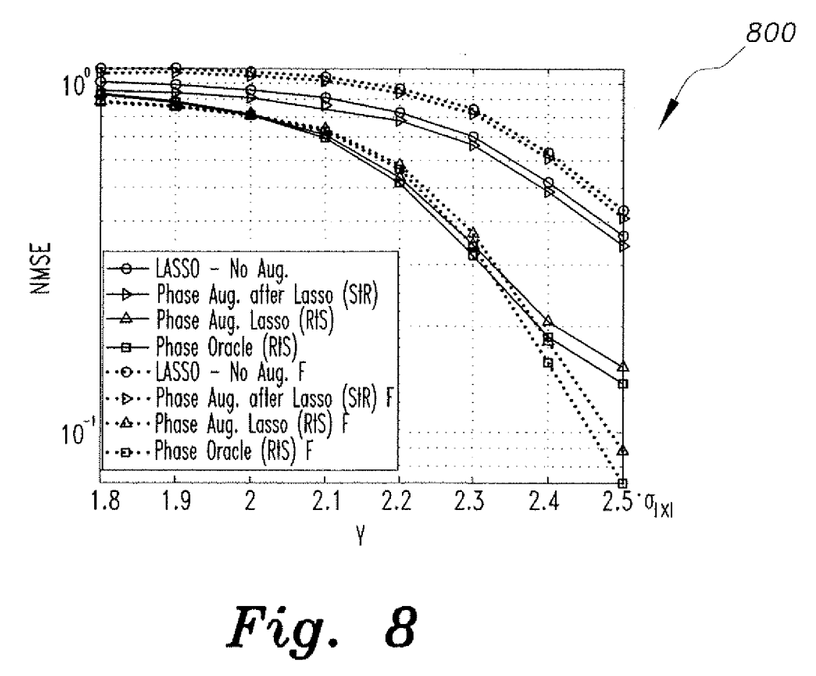
FIG. 8 is a plot of NMSE, showing digital clipper estimate as a function of the clipping threshold.
Figure 9:
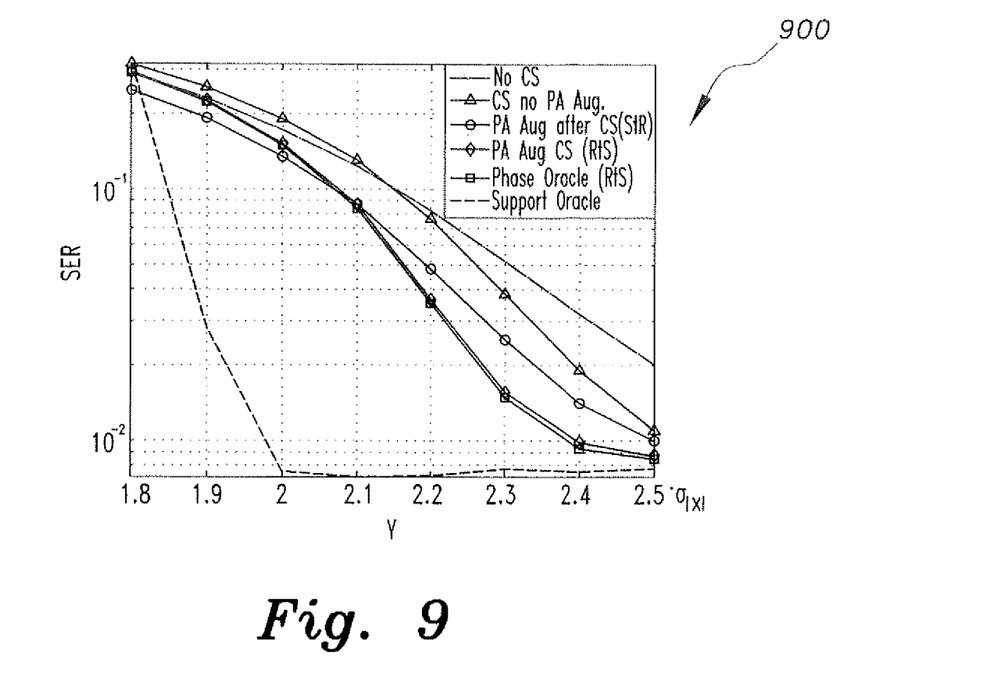
FIG. 9 is a plot of SER with digital clipping.

To see the effect of varying the magnitude of active coefficients in digital clipping in homogenous clipping techniques that employ digital magnitude clipping, we plotted the NMSE vs. $\zeta$ in plot 700, shown in FIG. 7. This avoids a biased evaluation due to increased CNR with $\zeta$. The results imply that embedding the phase information into the LASSO in equation (19) is much more effective than rotating the estimate after compressed sensing in equation (18). It also shows that the former method is considerably close to a phase oracle that uses the same technique for practical values of $\zeta$ relative to $\sigma_{|x|}$. However, as expected they eventually deviate as we increase $\zeta$, since this corresponds to decreasing the SNR and hence the accuracy of the phase information induced from the data vector estimate $\theta_{\bar{x}}$. Plot 800, shown in FIG. 8, implies that forcing the magnitudes of the estimates in equations (18) and (19) is generally ineffective, except in the very sparse cases, for the former. The overall result on the SER is portrayed in plot 900 of FIG. 9 at a fixed $\zeta$=0.8 $\sigma_{|x|}$.

Figure 10:
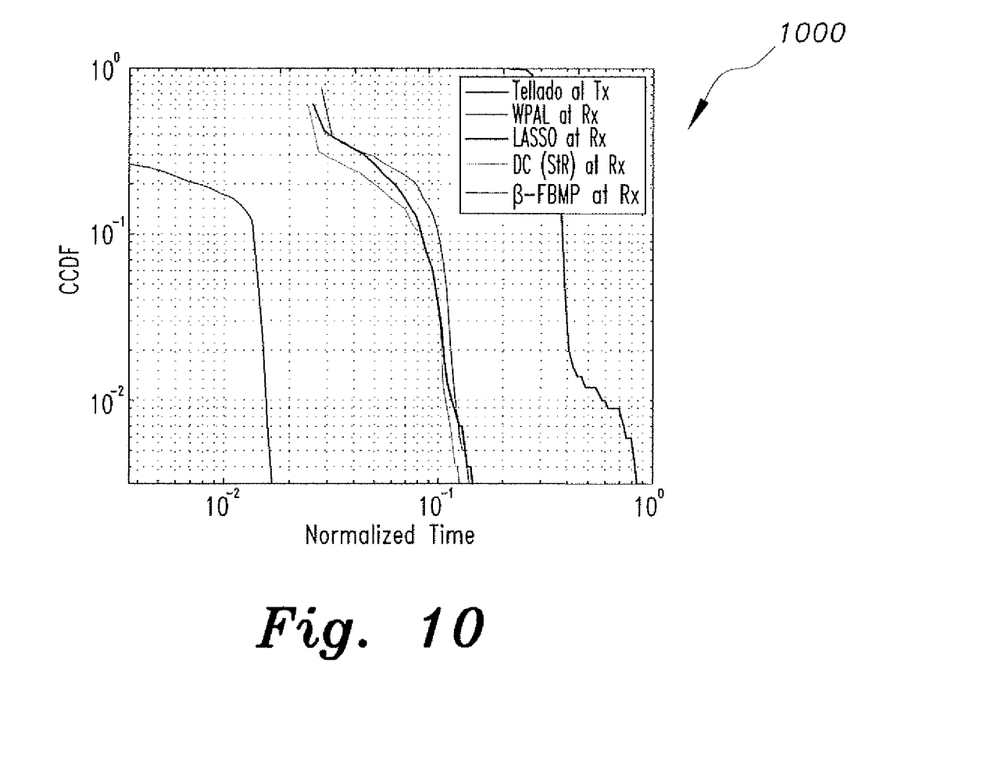
FIG. 10 is a CCDF plot, showing execution time normalized by maximum value.

From the standpoint of complexity, we neglect mentioning implementation and orders of complexity, since they match those of standard algorithms we've built on and that are well documented in the CS literature. Instead, we investigate the practical aspect of the relative time required to execute the major techniques proposed herein compared to a prior art technique based on Tellado's primary tone-reservation algorithm using the same generic CVX software (see M. V. Grant and S. Boyd, "CVX: Matlab software for disciplined convex programming" (web page and software), stanford.edu/boyd/cvx, February 2009). As such, we collected the random execution times for 2000 runs of each, normalized them by the maximum execution time among all, and plotted their CCDF. Plot 1000 of FIG. 10 depicts the results. Roughly speaking, the methods stemming from the LASSO required less then 12% of the time required to execute Tellado's primary QCQP algorithm on average, while the $\beta$-FBMP required less than 2% of the time.

Figure 11:
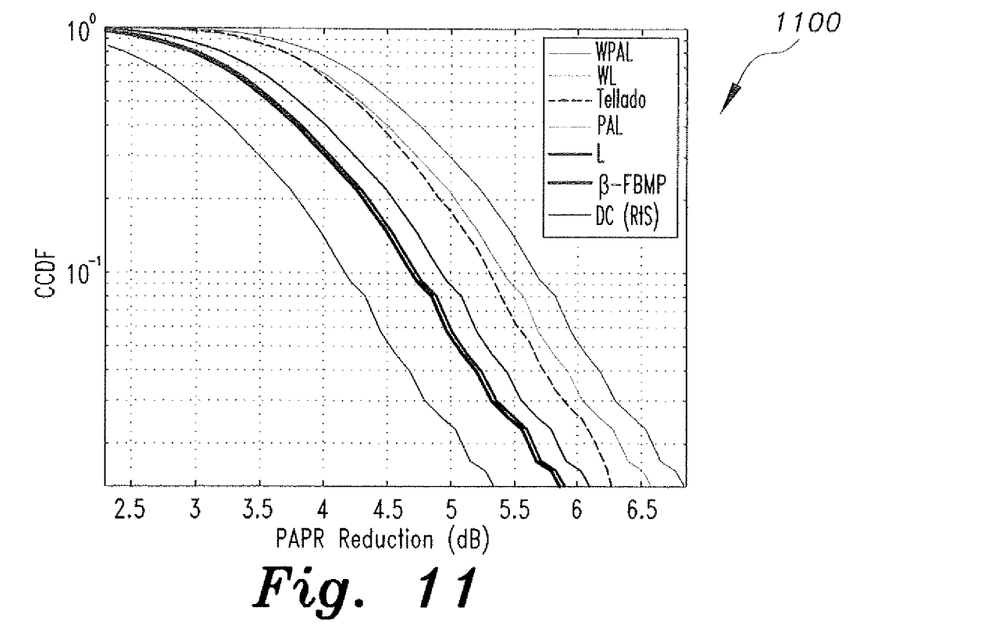
FIG. 11 is a plot of CCDF vs. PAPR Reduction.

A major advantage of clipping to a fixed threshold is that, unlike tone-reservation methods, the dynamic range, maximum power, and PAPR of the transmitted signal are fixed. The distribution of PAPR reduction, $$10\log_{10}\left(\frac{P_{max}}{\gamma^2}\right),$$

would simply follow from the distribution of the maximum squared coefficient in x, which is shown in plot 1100 of FIG. 11. The fixed maximum power follows from the clipping threshold that corresponds to a SER of $10^{-2}$ for the different techniques described herein.

The most fundamental parameter of interest given a desired clipping threshold is the channel capacity:

$$C = \sum_{k=1}^{N} \log_2\left(1 + \frac{|D(k,k)|^2 \sigma_{x(k)}^2}{\sigma_{z(k)}^2}\right),$$

and therefore two systems are considered. The first system, $S_1$, clips all coefficients above $\gamma$ and does not reserve tones to estimate the clipping signal c, resulting in a higher clipping noise over all N tones while maintaining all of them for data transmission. The second system, $S_2$ reserves in tones to estimate c, thus reducing the SER degradation while also reducing the data tones by m. The justification, hence, depends very much on the variances of the clipping noise $\{\sigma_c^2(k;\gamma)\}_{k\in\Omega_d}$, with and without estimation at the receiver. Furthermore, if the threshold $\gamma$ is sufficiently low relative to $\sigma_{|x|}$ (e.g., $E[\|c\|_0;\gamma]$=10% of N), the clipping noise on each tone will be the result of a reasonably large summation of scaled coefficients of c in the time domain, and so will the distribution of the priors in equation (11) converge to a Gaussian. With this theoretical justification aided by extensive simulations, we will assume for simplicity that the distortion on each carrier follows a Gaussian with a common variance $\sigma_c^2$. Consequently, the capacity of the first system (after dropping the index) will be:

$$C_1 = N\log_2\left(1 + \frac{|D|^2 \sigma_x^2}{|D|^2 \sigma_c^2 + \sigma_z^2}\right) \qquad (22)$$

The capacity of the second will be:

$$C_2 = (N - m) \log_2\left(1 + \frac{|D|^2 \sigma_x^2}{|D|^2 \sigma_{(c-\hat{c})}^2 + \sigma_z^2}\right) \quad (23)$$

The use of reserved tones for CS is then justified if $C_2 > C_1$, i.e., when:

$$\sigma_{(c-\hat{c})}^2 < \frac{\sigma_x^2}{1 + \left[\frac{|D|^2 \sigma_x^2}{|D|^2 \sigma_c^2 + \sigma_z^2}\right]^{\frac{N}{N-m}} - 1} - \frac{\sigma_z^2}{|D|^2} \quad (24)$$

Figure 12:
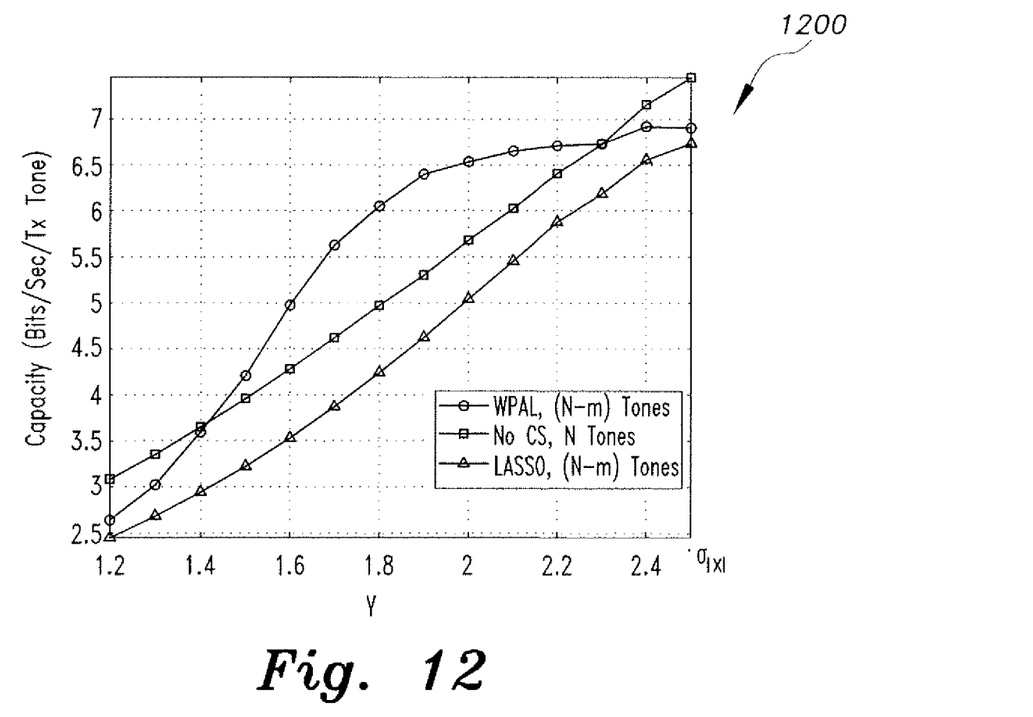
FIG. 12 is a plot showing capacity per transmitted tone at different clipping thresholds according to the present invention.

It would be very interesting to observe how this parameter behaves as a function of the clipping threshold γ as both the distortion $\sigma_c^2$ the quality of the estimate $\hat{\sigma}_c^2$ nonlinearly counteract each other. Plot 1200 of FIG. 12 shows such results upon 1,000 runs at each γ for estimating $\sigma_c^2$ and $\sigma_{(c-\hat{c})}^2$. The results show that by reserving 20% of the tones for data-based weighted and phase-augmented LASSO, the capacity of such a system (see plot 1300 of FIG. 13) can significantly outperform the naive system that uses all the tones for data transmission. The only obvious exceptions are at the impractical regions of high γ where insignificant PAPR reduction is achieved and $\sigma_c$ is very low to begin with, and the region of very low γ where WPAL fails and severe clipping deteriorates the signal. What's more, the capacity associated with this technique behaves in a convex fashion so that by reducing the capacity by less then 1 bit per second per transmitted tone, the clipping threshold can be dramatically reduced from γ=2.5$\sigma_{|x|}$ to γ=2$\sigma_{|x|}$. Unlike the semi-linear relation of $S_1$ with γ, such behavior offers a very tempting compromise between capacity and peak-reduction. Using the typical LASSO at such conditions is not justified.

Figure 13:
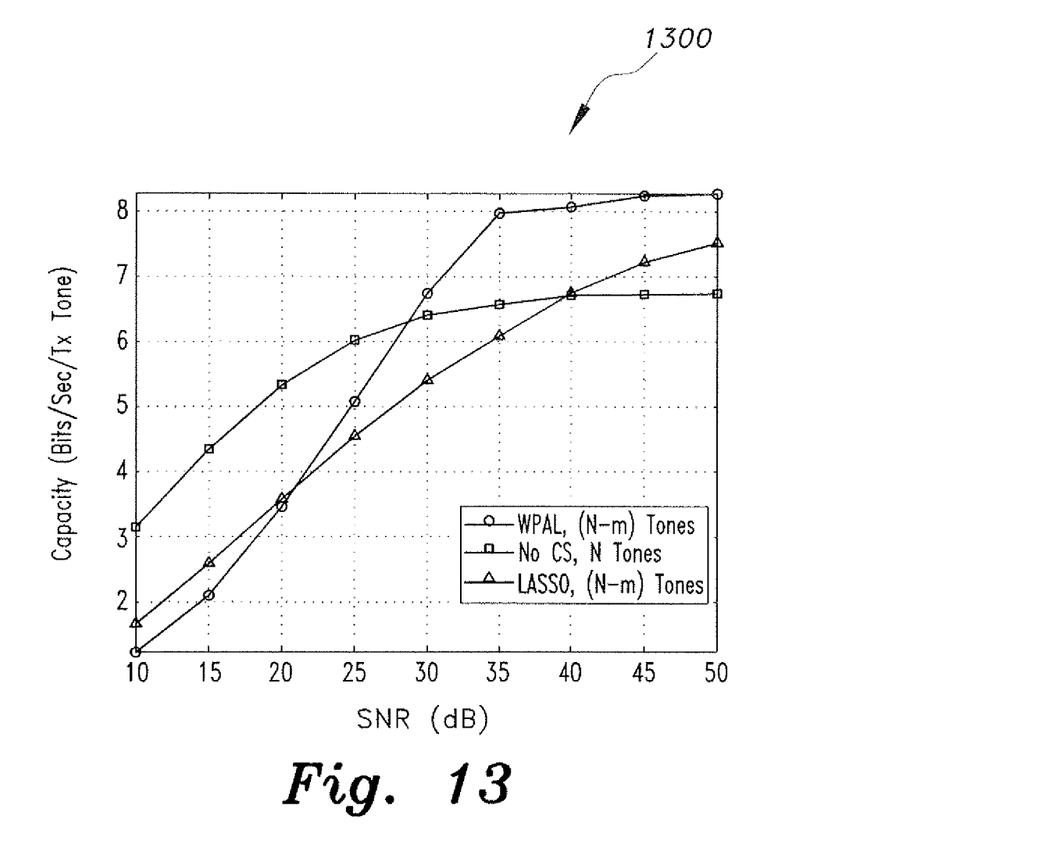
FIG. 13 is a plot showing capacity per transmitted tone vs SNR.

The reason is that under the pre-defined conditions of m and SNR, the reduction of $\sigma_{(c-\hat{c})}^2$ using the LASSO alone is insufficient to counteract the loss of data tones. Instead, by fixing γ to 2.2 $\sigma_{|x|}$ and varying the SNR, FIG. 13 shows that it becomes effective above an SNR of 40 dB. A similar conclusion can be made by varying the number of measurements m.

Thus, we have established the new general concept of clipping mitigation (and hence PAPR reduction) in OFDM using compressive sensing techniques. The general framework stresses the use of reserved subcarriers to compressively estimate the locations and amplitudes of the clipped portions of a transmitted OFDM signal at the receiver, instead of using them at the transmitter as a spectral support for optimized peak-reducing signals in the time domain. Consequently, the method interchanges the stage at which signal processing complexity is required compared to previous techniques, hence introducing a real solution to communication systems that use OFDM signals at the physical layer and require minimal complexity at the transmitter.

The other major contribution is demonstrating how, by a marginal increase in complexity, one can augment the standard $x_1$ minimization of CS by extracting information regarding clipping locations, magnitudes, and phases from the data, and hence enable the system to estimate sparse clippers far beyond the recoverability conditions of CS (e.g. sparsity levels above 55% of m). Such augmentation was shown to significantly boost the overall system's capacity at low clipping thresholds, and thus suggests a very appealing compromise between capacity and peak-reduction.

It will be understood that the diagrams in the Figures depicting the method of performing peak reduction and clipping mitigation are exemplary only, and may be embodied in a dedicated electronic device having a microprocessor, microcontroller, digital signal processor, application specific integrated circuit, field programmable gate array, any combination of the aforementioned devices, or other device that combines the functionality of the method of performing peak reduction and clipping mitigation onto a single chip or multiple chips programmed to carry out the method steps described herein, or may be embodied in a general purpose computer having the appropriate peripherals attached thereto and software stored on a non-transitory computer readable media that can be loaded into main memory and executed by a processing unit to carry out the functionality of the steps of the methods described herein.

It is to be understood that the present invention is not limited to the embodiments described above, but encompasses any and all embodiments within the scope of the following claims.

We claim:

1. A computer-implemented method of performing peak reduction and clipping mitigation, comprising:
    receiving at a receiver a transmitted orthogonal frequency division multiplexed (OFDM) signal modulating a plurality of data symbols, the OFDM signal being clipped by a clipping signal c to lower the transmitted signal's peak-to-average power ratio, the clipping signal c being sparse in time;
    compressively sensing a peak-reduced portion of the received OFDM signal by utilizing an $l_1$ minimization scheme, an output of the compressively sensing step providing an estimate of the clipping signal c at the receiver;
    feeding through a remaining, non-peak reduced portion of the received OFDM signal;
    least squares estimating the remaining, non-peak reduced portion of the received OFDM signal, thereby providing a least squares estimated portion of the remaining, non-peak-reduced portion of the received OFDM signal;
    combining the least squares estimated portion of the received OFDM signal with the estimate of the clipping signal c, thereby resulting in a combined estimate of the transmitted OFDM signal; and
    transforming the combined estimate of the transmitted OFDM signal, thereby recovering undistorted coefficients of the transmitted OFDM signal;
    whereby, the data symbols in the transmitted OFDM signal are accurately recovered.

2. The computer-implemented method of performing peak reduction and clipping mitigation according to claim 1, further comprising augmenting a phase of the received OFDM signal during the compressively sensing step to aid in accurate recovery of the OFDM transmitted data symbols.

3. The computer-implemented method of performing peak reduction and clipping mitigation according to claim 2, wherein said phase augmentation step further comprises rotating the phase with respect to an angle of individual complex coefficients of a received complex vector associated with the received OFDM signal.

4. The computer-implemented method of performing peak reduction and clipping mitigation according to claim 3, wherein said received complex vector is a sparse vector, said compressive sensing step estimating a pattern of sparsity therefrom.

5. The computer-implemented method of performing peak reduction and clipping mitigation according to claim 4, further comprising automatically clipping high peaks of the received OFDM signal at an initial receiving stage by reducing an absolute value of the high peaks to an algorithmically determined lower level.

6. The computer-implemented method of performing peak reduction and clipping mitigation according to claim 4, wherein said phase augmentation step further comprises recovering locations, magnitudes, and phases of distorted coefficients of the automatically clipped received OFDM signal.

7. The computer-implemented method of performing peak reduction and clipping mitigation according to claim 5, wherein the peak-reducing signal is formulated based on a threshold level crossing of the received OFDM signal.

* * * * *